Nov. 27, 1951     J. C. DAVIS ET AL     2,576,107
ENDLESS CONVEYER STORAGE SYSTEM
Filed Nov. 5, 1948     2 SHEETS—SHEET 1
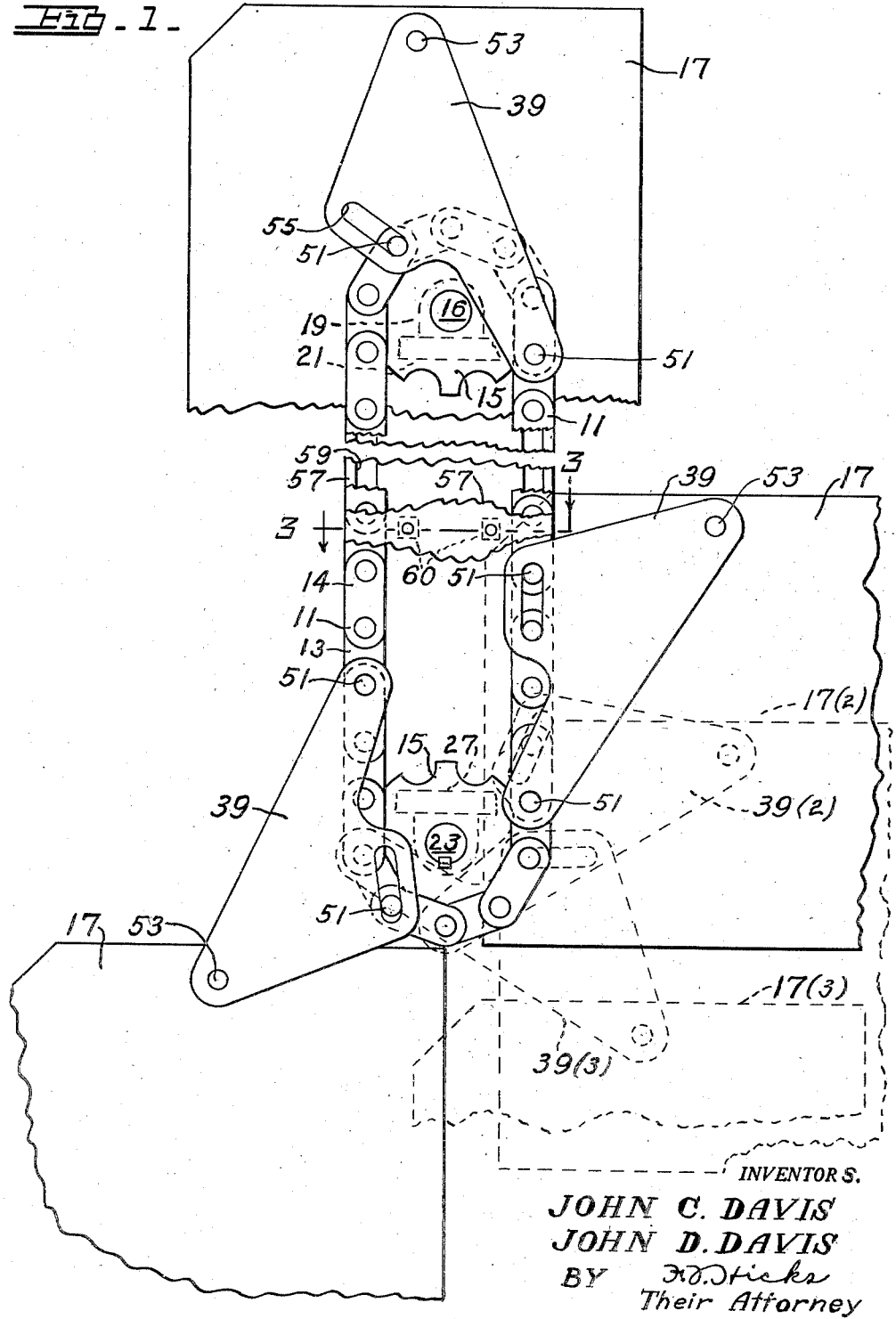
INVENTORS.
JOHN C. DAVIS
JOHN D. DAVIS
BY *Their Attorney*

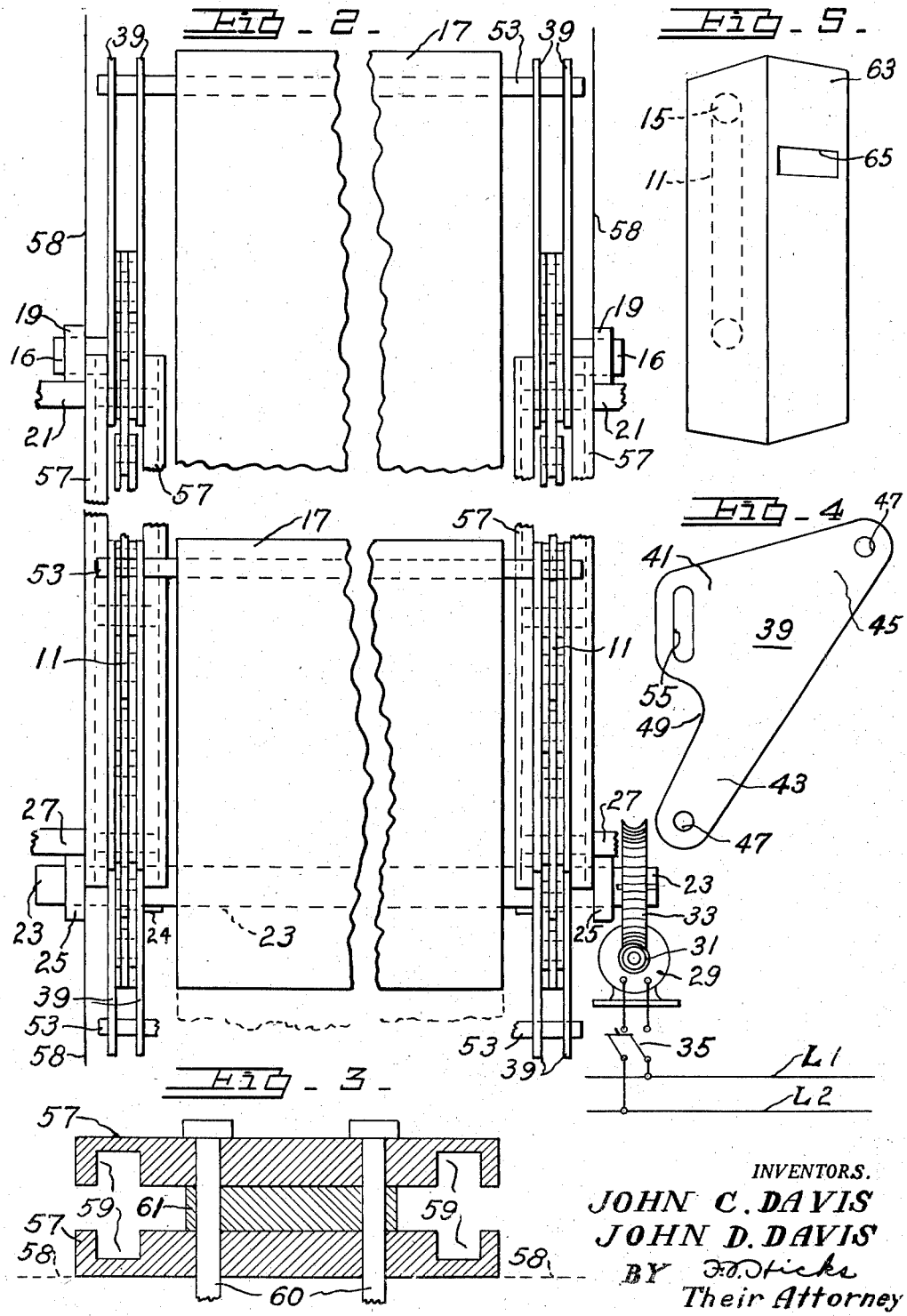

Patented Nov. 27, 1951

2,576,107

UNITED STATES PATENT OFFICE 2,576,107

ENDLESS CONVEYER STORAGE SYSTEM

John C. Davis and John D. Davis, Royal Oak, Mich.

Application November 5, 1948, Serial No. 58,546

3 Claims. (Cl. 198—158)

The invention pertains to an endless conveyor storage system and more particularly to the supporting arrangement provided for the merchandise receivers carried around in such a system.

It is an object of our invention to provide an endless conveyor storage system of a simple reliable construction wherein a great number of merchandise storage receivers may be carried.

It is also an object of our invention to provide such an endless conveyor storage system wherein a maximum number of receivers may be provided within any available space.

It is a further object of our invention to provide such an endless conveyor storage system wherein the merchandise receivers are always supported in an upright position while being moved around a closed circuit to bring any desired one of the receivers to a predetermined station for loading or unloading.

Another object of our invention is to provide improved support means for mounting and carrying the merchandise receivers in such an endless conveyor arrangement.

Further objects and advantages are within the scope of our invention, such as relate to the arrangement, operation and function of the related elements of the structure, to various details of construction and to combinations of parts, elements per se, and to economies of manufacture and numerous other features as will be apparent from a consideration of the specification in conjunction with the drawings disclosing specific embodiments of the invention, in which:

Fig. 1 is a side elevational view showing our endless conveyor storage system, partially broken away, and with various parts and successive positions thereof represented in dotted lines;

Fig. 2 is a front elevational view showing the endless storage system partially broken away;

Fig. 3 is an enlarged fragmentary sectional view, on line 3—3 in Fig. 1, showing the guide rails for guiding the chains;

Fig. 4 is a plan view of one of the bell-crank bearing members; and

Fig. 5 is a perspective view to a smaller scale showing an enclosed installation of our endless conveyor storage system.

Referring more specifically to Figs. 1 and 2 of the drawings, it will be seen that we have illustratively disclosed an embodiment of our endless conveyor storage system comprising a pair of endless support means 11, which may be sprocket chains of a conventional construction such as the pin and roller type, with inner links 13 and outer links 14 made of a length and size to suit the particular installation, and made of sufficient weight and strength to suit the load requirements of the particular installation. The two sprocket chains 11 run over rotary members 15, which are preferably conventional sprocket chain wheels, to run the two chains in a spaced parallel relation and to carry between them the merchandise or commodity receivers 17, which may be receptacles, boxes, platforms, or any structure suitable for holding the stored goods or merchandise.

For this purpose, two of the sprocket wheels 15 have shafts 16 which are rotatively supported in spaced relation at an upper level by a pair of separate bearings 19, mounted upon structural members 21 which may be the opposite sides of a portable cabinet. But, where the installation is a large permanent installation, the members 21 may be the structural elements of the building, and our system may extend through several floors, or from the basement and up through all the floors of the building. For the storage of perishable goods, such an enclosure, cabinet or building, may be refrigerated, in accordance with usual practice for storage purposes.

The two sprocket wheels 15 at the lower level are mounted spaced apart a like distance on an interconnecting shaft 23, to which both wheels are secured in any suitable manner, as by keys 24, to be driven therefrom in unison with the chains 11 passing around these sprocket wheels. This shaft is rotatively supported in suitable bearings 25 which may be mounted on suitable structural elements 27, available as a part of a building or a cabinet. Any suitable motive means 29, which as an electric motor, may be utilized for driving and it may be connected to the shaft 23 through any suitable speed reducing transmission, such as a worm 31 meshing with a worm wheel 33 secured on the shaft, for example. Start and stop means may simply consist of a manual switch 35 for throwing the motor 29 on the service lines L1 and L2, in the case of a small motor, to drive the shaft and thereby move the two chains 11 in unison and to move the receivers 17 around until the desired one is brought adjacent to a predetermined loading and unloading station. In the case of a large motor for a large heavy installation, there are various well known automatic motor starters, as will be understood, and if automatic push button selector operation is desired, there are numerous such selector systems which can be readily applied by those skilled in the electrical arts.

In accordance with our invention, we provide special receiver carrier or support means 39 for mounting and carrying the receivers 17 pivotally between the two chains 11 so that a maximum number of such receivers can be mounted in close proximity to each other with sufficient freedom in passing around the sprocket wheels at either end of the circuit. For this purpose we provide a plurality of these carriers or supports 39, each of which, as shown more clearly in Fig. 4, is substantially triangular in shape and provides a bell-crank having a central or junction portion 41 from whence two arms 43 and 45 extend having pin receiving apertures 47 in the extremities thereof. By extending these bell-crank arms 43 and 45, as may be seen in Fig. 4, at an angle slightly greater than a right angle, we have found that greater clearance is provided between the receivers for turning, and the receivers can be mounted closer together along the chains, which is apparent in Fig. 1. One edge of the arm 43 which is to be mounted along the chain is cut away to provide an open area 49 to pass freely around the shaft 23, and even with this cut out area, the form of this bell-crank is substantially a triangular shape. Since the two arms extend at an angle greater than a right angle, the form of this bell-crank member is substantially an oblique triangle. The hole in the end of the arm 43 to be attached to the chain is made suitable for receiving one of the sprocket chain pins 51 extended and the hole in the end of the other, or outwardly projecting arm 45, is suitable for receiving a rod 53 for pivotal attachment to a receiver. The central or junction portion 41 of this bell-crank is provided with a pin receiving aperture 55 in the form of an elongated slot so that it may act both as a fulcrum and slidably upon another one of the pins 51 projecting from the sprocket chain, when it is carried around one of the sprocket wheels, as may be seen by the dotted intermediate positions (2) and (3) represented by dotted lines in Fig. 1. These bearing bell-cranks are of course made of a size with one arm 43 having a suitable length according to the length of the chain links and hence to suit the spaced distance between the extended chain pins 51. The other arm 45 which projects outwardly, is made of a suitable length to hold the receivers 17 pivotally suspended out at a distance suitable for the installation. The rod 53 extends through the upper portion of a receiver 17 and projects to opposite sides thereof to be pivotally mounted in bell-crank supports at similar levels between the two chains. At each such position there are preferably two bell-cranks on opposite sides of the chain and carried on the opposite ends of chain pins 51 extending from the chain. These bell-crank bearing members 39 may be cut out of steel plate of a thickness sufficient to provide the strength and rigidity necessary for the particular installation.

The two point connection of the bell-cranks on the chains tends to deflect the included portions of the chains away from the straight run on each side of the system, and to resist this we provide guide means which, as shown in Fig. 3, comprises a pair of guide rails 57 each having spaced apart marginal grooves 59 through which the opposite ends of the extended chain pins 51 may pass freely along both straight runs on the chain. The guide rails 57 are securely mounted along the side 58 of the cabinet, or building or other enclosing structure, as by screws 60, or other bolts or fastening means, passing therethrough into adjacent structure or walls. These guide rails are mounted in pairs with the grooved sides opening toward each other in cooperative alignment, and a spacer 61 inserted therebetween holds these guide rails spaced so far apart that the chains can pass freely therebetween, and the thickness of the bell-cranks being also provided for. If desired the guide rails are fabricated together into a unitary supporting structure instead of being supported on a building or cabinet, as will be understood. Only the outer ends of the extended chain pins 51 are received in the guide grooves, as may be seen in Fig. 2.

Fig. 5 shows one possible installation of our endless conveyor storage system in an enclosing cabinet 63 having one open doorway 65 through which all the merchandise receivers 17 may be loaded in succession, as these are brought into alignment with this predetermined loading and unloading station. The cabinet 63 may be either a small portable enclosure or it may extend up through several floors of a building, as desired.

It is apparent that within the scope of our invention modifications and different arrangements may be made other than herein disclosed, and the present disclosure is illustrative merely, the invention comprehending variations thereof.

What is claimed as the invention is:

1. In an endless conveyor storage system the combination of, a pair of upper chain sprocket wheels, means rotatively supporting said wheels in a spaced relation at an upper level, a pair of sprocket chains passing over said wheels, a pair of lower sprocket wheels, a shaft rotatively supporting and driving said pair of lower sprocket wheels spaced apart suitably at a lower level for receiving said chains, a plurality of pairs of carriers supported along on said chains on opposite sides of both chains and paired at corresponding levels, each of the carriers being of a substantially triangular shape with two apices disposed upon extended pins of its supporting chain, the third apex of each carrier projecting outwardly, one of said two apices being apertured and the other being slotted for receiving the extended chain pins, storage receivers of a size and shape suitable to be carried by and between said pair of chains, means pivotally supporting one of said storage receivers between the projecting apices of a pair of the carriers at each level for movement around an endless circuit while always suspended from the chains in an upright position, means for driving said shaft to move said storage receivers around a predetermined path so that any desired one of the receivers may be brought to a predetermined station adjacent said path, said carriers being of such a size relative to the chain links that said two apices of each carrier are widely spaced to rest upon pins extended from the chain at widely separated points, the side of each triangular carrier between said two apices being provided with a cut out area for clearance in passing under the shaft as the chains pass under the lower sprocket wheels, and the storage receivers being of the largest possible size to efficiently utilize the available space for storage of commodities in said receivers.

2. A storage receiver carrier for suspending a commodity receiver from a sprocket chain comprising, a heavy rigid member of substantially triangular shape having one apex slotted and the other two apices apertured, said member being of a size suitable for having the slotted apex disposed upon a pin extended from a chain with one of the apertured apices disposed upon a pin extending from a chain at a remote point from the first mentioned pin to support the member upon the chain with the other apertured apex projecting outward from the chain for attachment to a storage receptacle to be carried thereby, and the side edge of said member between the two apices which are to be mounted upon the chain having an open clearance area.

3. A storage receiver carrier for suspending a commodity receiver from a sprocket chain comprising, a heavy rigid member of substantially triangular shape having one apex slotted and the other two apices apertured, said member being of a size suitable for having the slotted apex disposed upon a pin extended from a chain with one of the apertured apices disposed upon a pin extending from a chain at a remote point from the first mentioned pin to support the member upon the chain with the other apertured apex projecting outward from the chain for attachment to a storage receptacle to be carried hereby, and the rigid triangular shaped member being substantially in the form of an obtuse triangle.

JOHN C. DAVIS.
JOHN D. DAVIS.

REFERENCES CITED

The following references are of record in the file of this patent:

UNITED STATES PATENTS

| Number | Name | Date |
|---|---|---|
| 899,854 | Younkman | Sept. 29, 1908 |
| 1,793,062 | Collier | Feb. 17, 1931 |
| 2,315,790 | Hallwood | Apr. 6, 1943 |